United States Patent [19]

Huemke et al.

[11] Patent Number: 5,356,959
[45] Date of Patent: Oct. 18, 1994

[54] EPOXY RESINS FOR TERNARY SULFONIUM ELECTROCOATING COMPOSITIONS

[75] Inventors: Klaus Huemke, Freidelsheim; Christian Sinn, Kiel, both of Fed. Rep. of Germany

[73] Assignee: BASF Lacke & Farben Aktiengesellschaft, Muenster, Fed. Rep. of Germany

[21] Appl. No.: 96,991

[22] Filed: Jul. 27, 1993

[30] Foreign Application Priority Data

Jul. 28, 1992 [DE] Fed. Rep. of Germany ....... 4224882

[51] Int. Cl.⁵ .................. C08G 59/50; C08L 63/02
[52] U.S. Cl. ..................... 523/404; 523/414; 523/415; 523/416; 525/523; 525/525; 525/528; 525/533; 528/45; 528/104; 528/109; 428/418; 204/181.7
[58] Field of Search .......... 523/404, 414, 415, 416; 525/523, 525, 528, 533; 528/45, 104, 109; 428/418; 204/181.7

[56] References Cited

U.S. PATENT DOCUMENTS 4,419,467 12/1983 Wismer ................. 528/110
4,715,898 12/1987 Johnson ................ 525/533
5,003,025 3/1991 Dobblestein et al. ....... 528/109
5,106,469 4/1992 Johnson ................ 525/533

*Primary Examiner*—Frederick Krass
*Attorney, Agent, or Firm*—Keil & Weinkauf

[57] ABSTRACT

Epoxy resins obtainable by reacting

A) a polyfunctional epoxide, which carries on average 1.5 to 2.5 epoxy groups per molecule and has an epoxide equivalent weight of from 100 to 2000, with based on 1 mol of epoxy groups B) from 0.1 to 0.5 mol of an alkylphenol, the alkyl groups of which carry from 6 to 20 carbon atoms, and C) from 1 to 100 mmol of a polyoxyalkylenediol obtained from 1,2-propylene oxide, or of a copolymer obtained from 1,2-propylene oxide and other alkylene oxides, which has an average molecular weight of from 200 to 5000 and, on average, from 1 to 4 sulfonic acid groups bonded to methyl groups per molecule, and also D) from 0.2 to 0.3 mol of a diol, which is
   d1) a phenolic diol and/or
   d2) a polyoxyalkylenediol which has an average molecular weight of from 200 to 5000, with the proviso that the reaction product has an epoxide equivalent weight of from 1000 to 5000, can be converted to pigment resins suitable for electrodeposition coating and pigment pastes can then be prepared from said resins.

7 Claims, No Drawings

EPOXY RESINS FOR TERNARY SULFONIUM ELECTROCOATING COMPOSITIONS

The present invention relates to novel epoxy resin which are obtainable by reacting
A) a polyfunctional epoxide, which carries on average 1.5 to 2.5 epoxy groups per molecule and has an epoxide equivalent weight of from 100 to 2000, with based on 1 mol of epoxy groups
B) from 0.1 to 0.5 mol of an alkylphenol, the alkyl groups of which carry from 6 to 20 carbon atoms, and
C) from 1 to 100mmol of a polyoxyalkylenediol obtained from 1,2-propylene oxide, or of a copolymer obtained from 1,2-propylene oxide and other alkylene oxides, which has an average molecular weight of from 200 to 5000 and, on average, from 1 to 4 sulfonic acid groups bonded to methyl groups per molecule, and also
D) from 0.2 to 0.3 mol of a diol, which is
  d1) a phenolic diol and/or
  d2) a polyoxyalkylenediol which has an average molecular weight of from 200 to 5000,
with the proviso that the reaction product has an epoxide equivalent weight of from 1000 to 5000.

The invention also relates to a process for preparing said epoxy resins. Base resins for pigment pastes in electrodeposition coating, which are prepared from the epoxy resins by reaction with a sulfide in the presence of an acid, and a process for preparing these base resins are also subjects of the invention. The invention also relates to pigment pastes which contain the said base resins, the use thereof in electrodeposition coating, a process for electrodeposition coating using said pigment pastes and articles coated by this process.

As is known, in electrodeposition coating the pigments to be deposited on a surface are triturated or ground in a base resin. This base resin is then cathodically deposited with further coating and binder components and crosslinking agents in the electrodeposition bath and cured by the action of heat.

EP-A 0 251 772 describes base resins which are synthesized from an epoxy resin which contains ternary sulfonium groups and alkylphenols, the number of carbon atoms in the alkyl groups being at least 4. After cathodic deposition on metal surfaces, pigment pastes prepared from these resins lead to uniform coatings with satisfactory protection against corrosion. However, the throwing power, ie. the deposition of the coating at points on the metal body at which the electric field is, for spatial reasons, only weak, leaves something to be desired.

It is an object of the present invention to provide base resins for pigment pastes in electrodeposition coating which, coupled with good protection against corrosion, also ensure a high throwing power. The good throwing power should be achieved irrespective of whether lead-containing or lead-free pigment pastes are used.

We have found that this object is achieved by the epoxy resins defined at the outset.

We have also found a process for their preparation, base resins containing said epoxy resins and a process for preparing the base resins. Pigment pastes which contain said base resins and are suitable for electrodeposition coating, a process for electrodeposition coating using said pigment pastes and articles coated by this process have also been provided.

The embodiments which are particularly advantageous for use of the epoxy resins in electrodeposition coating are described below.

COMPONENT A

Component A comprises polyfunctional epoxy compounds which on average carry 1.5 to 2.5 epoxy groups per molecule and have an epoxide equivalent weight of 100 to 2000. For the purposes of the invention epoxide equivalent weight is the numerical value which is obtained by dividing the molecular weight by the average number of epoxy groups in the molecule. However, for reasons of a polymer structure which is as linear as possible, compounds containing two epoxy groups are preferred.

Preferred compounds are polyglycidyl ethers, which are obtainable by reacting polyphenols with epihalohydrins, preferably epichlorohydrin. Polyphenols which may be mentioned are 4,4'-dihydroxybenzophenone, 4,4'-dihydroxyphenyl sulfone, 1,1-bis(4-hydroxyphenyl)ethane, 1,1-bis(4-hydroxyphenyl)isobutane, 2,2-bis(4-hydroxy-3-tert-butylphenyl)propane, 1,5-dihydroxynaphthalene and preferably 2,2-bis(4-hydroxyphenyl)propane(bisphenol A).

In addition to epoxy compounds obtained from polyphenols and epihalohydrins, polyglycidyl ethers of polyhydric aliphatic alcohols can also be used. These are preferably polymers of ethylene oxide, propylene oxide or tetrahydrofuran. Both homopolymers and copolymers can be used as alcohol component.

It is also possible to use mixtures of different polyfunctional epoxides.

COMPONENT B

The polyfunctional epoxides are reacted with alkylphenols. The number of carbon atoms in the alkyl groups is from 6 to 20. Monosubstituted alkylphenols are preferred and amongst these 4-octylphenol, 4-nonylphenol and 4-dodecylphenol are particularly preferred.

Based on 1 mol of epoxy groups, from 0.1 to 0.5 mol, preferably from 0.2 to 0.35 mol, of alkylphenol is used.

COMPONENT C

This diol component is used for chain propagation in the resin synthesis. Diols which may be mentioned here are polyoxyalkylenediols which are synthesized from 1,2-propylene oxide or from 1,2-propylene oxide and further alkylene oxides, such as ethylene oxide and tetrahydrofuran. Compounds randomly synthesized from several components and also, preferably, block polymers are suitable.

The polyalkylenediols carry sulfonic acid groups, which are bonded to the methyl groups by reacting the polyoxyalkylenediols with chlorosulfonic acid in a known manner. For average molecular weights of from 200 to 5000, the average number of sulfonic acid groups is from 1 to 4 per molecule.

Block polymers obtained from propylene oxide and from 30 to 50 % by weight of ethylene oxide are particularly preferred; some of these are available commercially.

From 1 to 100 mmol, preferably from 5 to 50 mmol, of component C are used per mole of epoxy groups.

COMPONENT D

Like C, this component is used for chain propagation and the component concerned belongs to one of two classes of substance:

d1) Phenolic diols

Here the suitable phenolic diols are those which have already been mentioned as basic components for the polyfunctional epoxides (Component A). Bisphenol A is preferred.

d2) Polyoxyalkylenediols

Suitable compounds of this type are, in particular, homopolymers or copolymers of ethylene oxide, propylene oxide and tetrahydrofuran which have an average molecular weight of from 200 to 5000; these polyoxyalkylenediols do not contain a sulfonic acid group bonded to a methyl group.

Component A can be reacted stepwise with Components B, C and D. However, from the standpoint of the reaction procedure it is simpler initially to introduce a mixture of Components A to D and to start the reaction by adding a catalyst.

Catalysts which may be mentioned are tertiary amines, such as triethylamine and dimethylbenzylamine, and also phosphonium salts, such as ethyltriphenylphosphonium bromide.

In general, the reaction can be carried out without a solvent. Inert, high-boiling solvents, such as 2-butoxyethanol, diethylene glycol or dibutylglycol, can be added in amounts of usually less than 10 % by weight, based on the total batch, to reduce the viscosity. Temperatures of from 50° to 150° C. have proven particularly suitable. The reaction mixture is heated until the desired epoxide equivalent weight is obtained. As a rule from 1 to 4 hours suffice for this purpose.

The epoxy resins according to the invention obtained in this way are used as heat-curable resins. For their use in cathodic electrodeposition coating, they can be converted to water-soluble resins containing ternary sulfonium groups by reaction of the residual epoxy groups with an organic sulfide in the presence of an acid.

Organic sulfides which can be used for this purpose are aliphatic and aromatic compounds, such as diethyl sulfide, dipropyl sulfide, dibutyl sulfide and diphenyl sulfide, mixed aliphatic sulfides, such as ethyl phenyl sulfide, and cycloaliphatic sulfides, such as tetramethylene sulfide and pentamethylene sulfide. Compounds carrying non-interfering groups, such as thiodiethanol, thiodipropanol or thiodibutanol, may also be mentioned. Dibutyl sulfide and thiodiethanol are preferred.

The acids used can be all compounds which convert sulfide groups into ternary form. Mineral acids are therefore suitable; however, organic acids, the $pK_a$, value of which should be less than 5, are preferred and amongst these lactic acid, formic acid, acetic acid and propionic acid are particularly preferred.

Sulfide and acid can be added to the epoxy resin together or successively. The epoxy resin can, if desired, be prediluted with inert high-boiling solvents. The sulfide and the acid can also be dissolved in the solvents before they are added. In general, the compounds are added to the epoxy resin at from 50° to 100° C. Sulfide is added in such an amount that the reaction product carries from 0.01 to 0.25, preferably from 0.15 to 0.25, milliequivalents of ternary sulfonium groups per gram of resin.

The base resins obtained in this way are water-dilutable.

Pigment pastes are prepared from the base resins according to the invention in a manner known per se. To this end, the base resin is as a rule diluted with water to a solids content of from 30 to 70 %. One or more pigments are then added and this mixture is ground to the desired fineness, for example in a ball mill.

Examples of such pigments are titanium dioxide, lead silicate, aluminum silicate, dibutyltin oxide, carbon black and zinc silicate. Pigments and base resin are preferably mixed in a ratio of from 1:1 to 10:1, preferably of from 1.5:1 to 5:1. The pigment pastes can also contain further additives customary in electrodeposition coating, such as fillers, dispersion auxiliaries or solvents.

For their use in electrodeposition coating, the pigment pastes according to the invention are generally combined with binder dispersions and crosslinking agent dispersions known per se. Depending on the application, the weight ratios of pigment paste to the mixture of binder dispersion and crosslinking agent dispersion range from 0.1:1 to 1:1.

The binders are as a rule based on epoxy resins obtained from polyfunctional epoxides, for example diglycidyl ethers of polyphenols, polyols and also polyamines. The amine groups can be quaternized so that the resins become water-soluble.

The crosslinking agents known per se are compounds which are able to exert a crosslinking effect by reason of various reactions. The following classes of compound can preferably be used for this purpose:
amidation crosslinking agents,
transamination crosslinking agents,
transesterification crosslinking agents and
polyfunctional blocked isocyanates.

Amidation crosslinking agents are those organic compounds which react with primary and/or secondary amino groups in the epoxy resin only under stoving conditions, with amide formation. Examples are resins which have an average molecular weight of from 200 to 10000 and contain at least two carboalkoxymethyl groups, such as are described in DE-A 31 45 714.

Transamination crosslinking agents are organic compounds which react with the primary and/or secondary amino groups in the epoxy resin under stoving conditions with amine elimination in such a way that crosslinking agent and epoxy resin are linked via these groups. Examples are Mannich bases, which are synthesized from phenols, formaldehyde and secondary amines. Those compounds which are synthesized from polyalkylene oxide diglycidyl ethers and aromatic dihydroxy compounds such as bisphenol A and then reacted with secondary acyclic or cyclic aliphatic amines, such as dimethylamine, diethylamine or piperidine, and with formaldehyde or formaldehydeproviding compounds are particularly preferred.

Transesterification crosslinking agents can react with epoxy resins carrying hydroxyl groups, transesterification taking place. Examples are resins which are synthesized from acrylic acid esters, but also resins containing malonate groups, such as are described in DE-A 37 35 601.

Polyfunctional isocyanates are particularly preferred and amongst these, for example, tolylene diisocyanate, 4,4'-diphenylmethane diisocyanate, isophorone diisocyanate or trimerized hexamethylene diisocyanate. These isocyanates are preferably used in blocked form. Customary blocking agents are amines, such as dibutylamine, which react to give urea compounds, alcohols, such as methanol or ethanol, or polyhydric alcohols, such as polyoxyalkylene glycols, which formurethane groups, and ketoximes, such as methyl ethyl ketoxime, which also react by addition to an isocyanate group.

After partial or complete neutralization, the binders are dispersible in water. Acids which can be used for neutralization are, preferably, carboxylic acids, such as formic acid, acetic acid, propionic acid and lactic acid, but also inorganic acids, such as phosphoric acid. Neutralization of the binder and of the crosslinking agent can be carried out separately, but preferably together after prior mixing. The dispersions thus obtained can be diluted to a desired solids content with water, if desired after removal of organic solvents.

Binder, crosslinking agent and pigment paste are introduced into an electrodeposition bath, the solids content is adjusted by dilution with water and the articles to be coated are treated in a manner known per se.

After cathodic deposition, the pigment pastes according to the invention provide good corrosion protection on metal surfaces. In addition, a good throwing power is obtained, specifically both with lead-containing and with lead-free pigment pastes.

EXAMPLES 1.1 General method for the preparation of epoxy resins R according to the invention The catalyst E is added to components A, B, C and D in the amounts indicated in Table 1, at 110° C. After 90 minutes at 130° C., the epoxide equivalent weight EEW is determined. $M_w$ in the table is the average molecular weight of the compounds.

TABLE 1

|   |   | R 1 | R 2 | R 3 |
|---|---|---|---|---|
| A/1 | Bisphenol A diglycidyl ether EEW 188 | 1128 g<br>3.0 mol | 2369 g<br>6.3 mol | 4061 g<br>10.8 mol |
| A/2 | Diglycidyl ether of a polyethylene glycol, $M_w$ 430 | 138 g<br>0.28 mol | — | — |
| A/3 | Diglycidyl ether of a polyethylene glycol, $M_w$ 430 | — | 1115 g<br>1.17 mol | — |
| A/4 | Diglycidyl ether of a polytetrahydrofuran, $M_w$ 400 | — | — | 496 g<br>0.56 mol |
| B/1 | Octylphenol | — | — | 330 g<br>1.6 mol |
| B/2 | Nonylphenol | 165 g<br>0.75 mol | 660 g<br>0.78 mol | — |
| B/3 | Dodecylphenol | 197 g<br>0.9 mol | 786 g<br>3.1 mol | 393 g<br>1.9 mol |
| C | Block polymer of 1,2-propylene oxide and ethylene oxide | 520 g<br>0.32 mol | 156 g<br>0.09 mol | 522 g<br>0.50 mol |
|   | % by weight of ethylene oxide | 41% | 34% | 35% |
|   | Sulfonic acid groups per molecule | 1% | 2 | 1 |
| D | Bisphenol A | 380 g<br>1.67 mol | 1140 g<br>5.0 mol | 1140 g<br>5.0 mol |
| E | Catalyst | 6,6 g of | 6 g of di- | 7.1 g of |

TABLE 1-continued

|   | R 1 | R 2 | R 3 |
|---|---|---|---|
|   | ethyltriphenylphosphonium bromide | methylbenzylamine | triethylamine |
| EEW | 1880 | 2200 | 1950 |

1.2 Preparation of base resins BR according to the invention

The batches described under 1.1 are successively diluted with a solvent and reacted with a sulfide and an acid at 80° C. The details are given in Table 2.

TABLE 2

|   | BR 1 | BR 2 | BR 3 |
|---|---|---|---|
| Epoxy resin | R 1 | R 2 | R 3 |
| Solvent | 2-Butoxyethanol<br>280 g | Diethylene glycol<br>912 g | Dibutylglycol<br>348 g |
| Sulfide | Thiodiethanol<br>78 g<br>0.64 mol | Dibutyl sulfide<br>223 g<br>1.53 mol | Thiodiethanol<br>203 g<br>1.67 mol |
| Acid | Lactic acid<br>178 g<br>60% by wt. | Lactic acid<br>275 g<br>60% by wt. | Lactic acid<br>250 g<br>60% by wt. |
| Milliequivalents of ternary sulfonium groups per gram of resin | 0.24 | 0.17 | 0.24 |

1.3 Comparison base resin BRC (according to EP-A 0 251 772 Example 3, page 6)

661 g (3.51 mol) of a polyglycidyl ether of bisphenol A (EEW 1020), 261 g (2.29 mol) of bisphenol A and 61.5 g (0.23 mol) of dodecylphenol are heated to 107° C., 0.98 g of ethyltriphenylphosphonium iodide is added and the reaction mixture is kept at 125° C. for one hour (EEW 1020). 244 g (1.0 mol) of thiodiethanol, 134 g (1.0 mol) of dimethylpropionic acid and 30.6 g of water are added at 75° C. and the components are kept at this temperature until virtually no further acid is detectable. The resin contains 0.97 milliequivalents of ternary sulfonium groups per gram of resin.

1.4 Preparation of pigment pastes P according to the invention and comparison pastes PC In addition to the constituents indicated in Table 3, the pigment pastes each contain 35 g of aluminum silicate, 11 g of dibutyltin oxide and 3.5 g of carbon black beads.

TABLE 3a

|   | According to the invention | | | Comparison |
|---|---|---|---|---|
| [g] | P1<br>BR1 | P2<br>BR2 | P3<br>BR3 | PC1<br>BRC |
| Base resin | 73 | 77 | 70 | 98 |
| Titanium dioxide | 175 | 175 | 175 | 175 |
| Lead silicate | 8 | 8 | 8 | 8 |
| Zinc silicate | — | — | — | — |
| Water | 195 | 190 | 198 | 169 |

TABLE 3b

|   | According to the invention | | | Comparison |
|---|---|---|---|---|
| [g] | P4<br>BR1 | P5<br>BR2 | P6<br>BR3 | PC2<br>BRC |
| Base resin | 73 | 77 | 70 | 98 |
| Titanium dioxide | 155 | 155 | 155 | 155 |
| Lead silicate | — | — | — | — |
| Zinc silicate | 28 | 28 | 28 | 28 |

TABLE 3b-continued

| [g] | According to the invention | | | Comparison |
|---|---|---|---|---|
| | P4 BR1 | P5 BR2 | P6 BR3 | PC2 BRC |
| Water | 195 | 190 | 198 | 169 |

| | According to the invention | | | Comparison | According to the invention | | | Comparison |
|---|---|---|---|---|---|---|---|---|
| | P1 | P2 | P3 | PC1 | P4 | P5 | P6 | PC2 |
| U [V] | 330 | 330 | 340 | 240 | 320 | 260 | 310 | 190 |
| CT [μm] | 24 | 25 | 24 | 18 | 22 | 23 | 24 | 16 |
| Corrosion | | | | | | | | |
| R | 1.6 | 1.5 | 1.3 | 2.3 | 2.2 | 2.3 | 1.9 | 4.3 |
| A | 0 | 0 | 0 | 1 | 1 | 1 | 0 | 2 |
| E | 2 | 1 | 2 | 4 | 5 | 4 | 3 | 5 |

The indicated amounts of all components are ground in a ball mill to a particle size of $\leq 6\mu m$.

Larger amounts of the comparison resins than of the resins according to the invention are needed to stabilize the indicated amounts of pigment in the particular paste, ie. to prevent settling of the pigments.

1.5 Preparation of a binder (according to DE-A 35 42 168, component A1, page 4 to 5)

300 g (4.0 mol) of methylethanolamine are added at 65° C. to 4.85 kg (5.0 mol) of a diglycidyl ether based on bisphenol A and epichlorohydrin (epoxide equivalent weight 485) in 1.04 kg of toluene and 1.04 kg of isobutanol. When an epoxide equivalent weight of 1070 is obtained, 1850 g of a solution of a condensation product and 128 g of isobutanol are added and the reaction mixture is heated at 80° C. for 2 h.

The condensation product is prepared by reacting 5.80 kg (50 mol) of hexamethylenediamine, 7.25 kg (12.5 mol) of dimeric oleic acid and 1.40 kg (5.0 mol) of linseed oil fatty acid at 195° C., distilling off the water of reaction. After adding 5.96 kg of toluene, this solution has a solids content of 70% by weight and an amine value of 197 mg/g.

1.6 Preparation of a crosslinking agent (according to DE-A 35 42 168, component B1, page 5)

388 g (3.0 mol) of dibutylamine are added at 70° C. to 504 g (1.0 mol) of trimerized hexamethylene diisocyanate in 382 g of toluene and the mixture is stirred until no further isocyanate is detectable.

1.7 Preparation of a binder/crosslinking agent dispersion 872 g of binder according to 1.5 and 364 g of crosslinking agent according to 1.6 are neutralized with 28.7 g of acetic acid and diluted with 1.2 kg of water.

2. Electrodeposition coating and tests 1964 g of the dispersion according to 1.7 and 568 g of pigment paste are mixed and made up to 5 kg with water (solids content 20%).

Coatings are deposited at room temperature in a conventional manner on phosphated steel sheets connected as cathode. These coatings are stoved by heating for 20 minutes at 165° C.

The deposition voltage U which is possible without the coating showing separation phenomena is determined; the deposition voltage U is an empirical measure of the throwing power since the throwing power is better with increasing deposition voltage. The coating thickness CT of the coating is also determined. The corrosion test according to DIN 50 021 is subdivided into:

R: Rust spread (downward migration) at the scratch in mm; the coating on the test sheet is scratched and the sheet is exposed to a corrosive atmosphere A: Area: 0=no rust, 5=severely rusted; after treatment in the corrosive atmosphere E: Edge: assessment as for A; method as for A The pigment pastes according to the invention allow a higher deposition voltage than the comparison pastes and therefore have a better throwing power than the latter. The deposited coatings are also thicker than in the comparison examples. The corrosion protection is better than in the comparison; the lead-containing pigment pastes give better results than lead-free pigment pastes, as in the comparison examples.

We claim:

1. An epoxy resin, obtained by reacting

A) a polyfunctional epoxide, which carries on average 1.5 to 2.5 epoxy groups per molecule and has an epoxide equivalent weight of from 100 to 2000, with based on 1 mol of epoxy groups from B) 0.1 to 0.5 mol of an alkylphenol, the alkyl groups of which carry from 6 to 20 carbon atoms, and C) from 1 to 100 mmol of a polyoxyalkylenediol obtained from 1,2-propylene oxide, or of a copolymer obtained from 1,2-propylene oxide and other alkylene oxides selected from the group consisting of ethylene oxide, tetrahydrofuran and mixtures thereof, which has an average molecular weight ($M_w$) of from 200 to 5000 and, on average, from 1 to 4 sulfonic acid groups bonded to methyl groups per molecule, and also D) from 0.2 to 0.3 mol of a diol, which is d1) a phenolic diol and/or d2) a polyoxyalkylenediol which has an average molecular weight ($M_w$) of from 200 to 5000 which does not contain a sulfonic acid group bound to a methyl group, with the proviso that the reaction product of A), B), C) and D) has an epoxide equivalent weight of from 1000 to 5000.

2. A process for preparing an epoxy resin as claimed in claim 1, which comprises reacting A) a polyfunctional epoxide, which carries on average from 1.5 to 2.5 epoxy groups per molecule and has an epoxide equivalent weight of from 100 to 2000, with based on 1 mol of epoxy groups from B) 0.1 to 0.5 mol of an alkylphenol, the alkyl groups of which carry from 6 to 20 carbon atoms, and C) from 0.1 to 100 mmol of a polyoxyalkylenediol obtained from 1,2-propylene oxide, or of a copolymer obtained from 1,2-propylene oxide and other alkylene oxides selected from the group consisting of ethylene oxide, tetrahydrofuran and mixtures thereof, which has an average molecture weight ($M_w$) of from 200 to 5000 and, on average, from 1 to 4 sulfonic acid groups bonded to methyl groups per molecule, and also D) from 0.2 to 0.3 mol of a diol, which is d1) a phenolic diol and/or d2) a polyoxyalkylenediol which has an average molecular weight ($M_w$) of from 200 to 5000 which does not contain a sulfonic acid group bound to a methyl group, with the proviso that the reaction product of A), B), C) and D) has an epoxide equivalent weight of from 1000 to 5000.

3. A resin which is suitable as a pigment (base) resin for cathodic electrodeposition coating and is obtained by reacting an epoxy resin as defined in claim 1, with an organic sulfide in the presence of an acid to form a reaction product, which reaction product contains from 0.01 to 0.25 milliequivalents of ternary sulfonium groups per gram of resin.

4. A process for preparing a resin as defined in claim 3, where the epoxy resin is reacted with an organic sulfide in the presence of an acid to form a reaction product, which reaction product contains from 0.01 to 0.25 milliequivalents of ternary sulfonium groups per gram of resin.

5. A pigment past containing a base resin as claimed in claim 3 and one or more pigments in a weight ratio of pigment to base resin from 1:1 to 10:1.

6. A process for cathodic electrodeposition coating wherein a pigment paste as defined in claim 5 is combined with dispersions of binders and crosslinking agents, the combination of pigment paste, binders and crosslinking agents is introduced into an electrodeposition bath, the combination cathodically is deposited onto a metal surface.

7. An article coated by means of cathodic electrodeposition coating and obtained by a process as claimed in claim 6.

* * * * *

UNITED STATES PATENT AND TRADEMARK OFFICE
CERTIFICATE OF CORRECTION

PATENT NO. : 5,356,959
DATED : October 18, 1994
INVENTOR(S) : Huemke, et al

It is certified that error appears in the above-indentified patent and that said Letters Patent is hereby corrected as shown below:

Claim 5, column 10, line 3:
        "past" should read -- paste --.

Claim 6, column 10, line 11:
        after "bath", insert -- and --.

Claim 6, column 10, line 11:
        after "combination" insert -- is --.

Claim 6, column 10, line 11:
        after "cathodically" delete -- is --.

Signed and Sealed this

Twentieth Day of December, 1994

Attest:

BRUCE LEHMAN

*Attesting Officer*      *Commissioner of Patents and Trademarks*